Patented Sept. 17, 1940

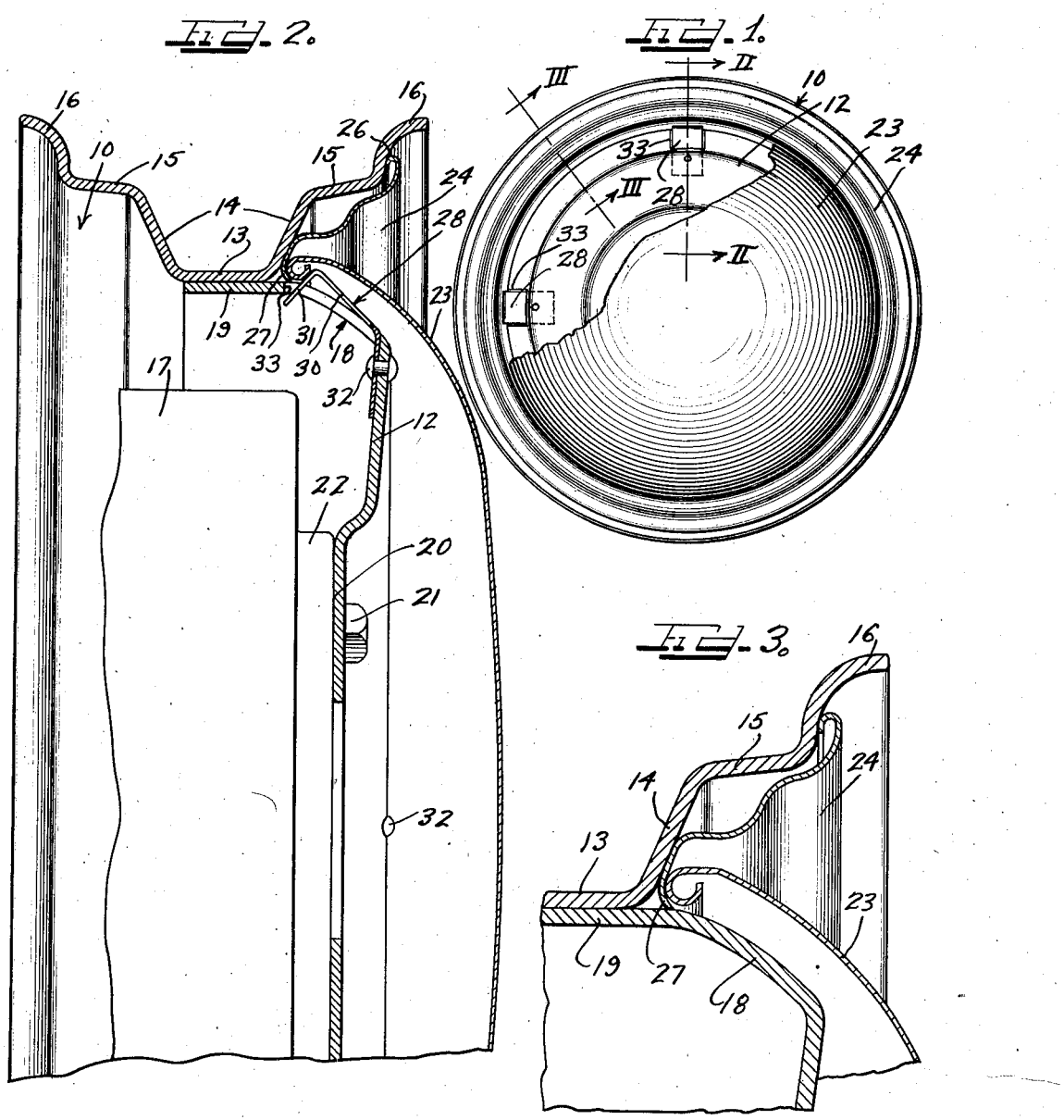

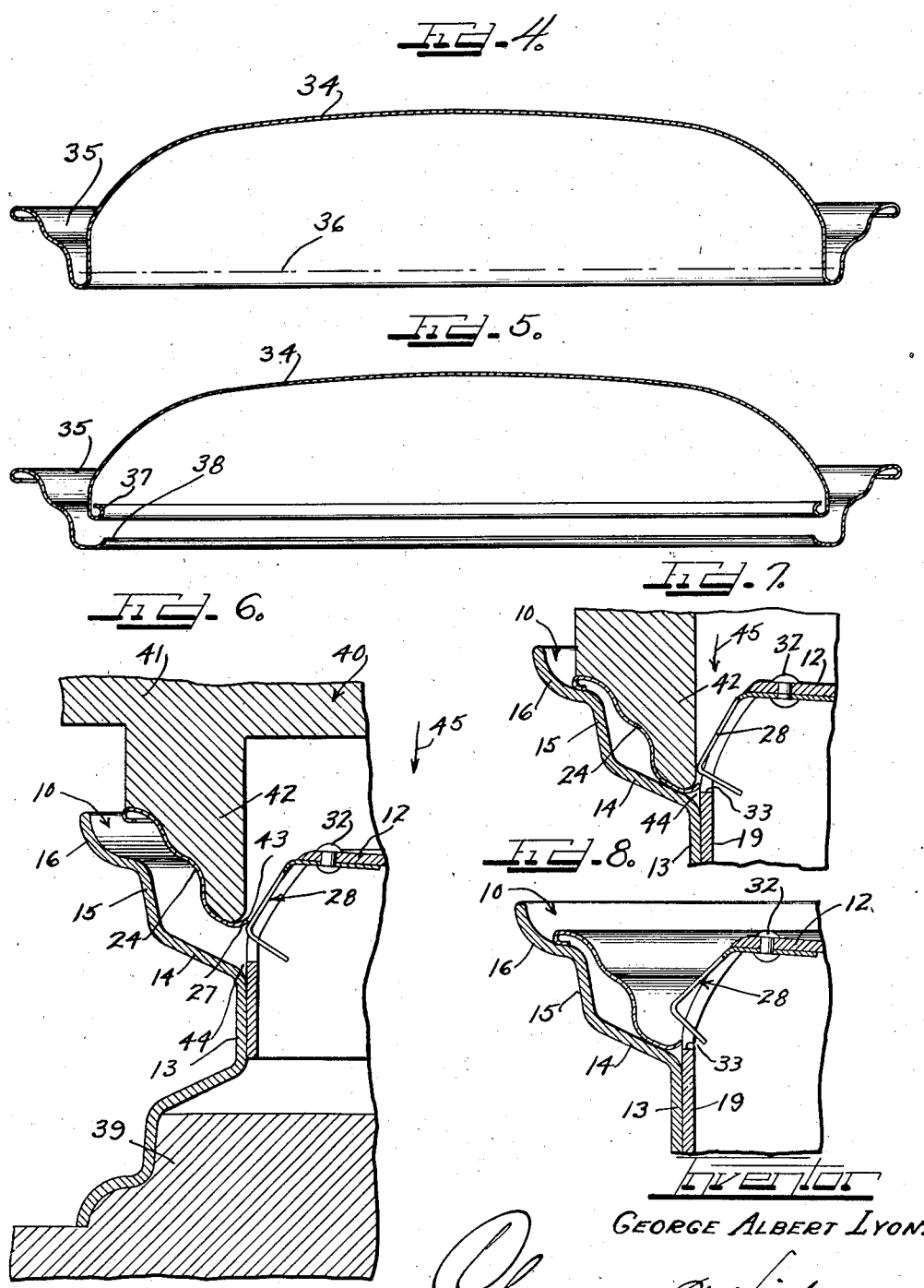

2,214,746

UNITED STATES PATENT OFFICE 2,214,746

WHEEL AND ORNAMENTAL ACCESSORY THEREFOR

George Albert Lyon, Allenhurst, N. J.

Application November 30, 1936, Serial No. 113,316
Renewed January 2, 1940

7 Claims. (Cl. 301—37)

In designing ornamental members adapted to be secured on the outer side of a wheel, it is considered important in the wheel manufacturing industry to provide a construction which may quickly and easily be assembled, which will not accidentally come off due to vibration or sudden jar, and which may readily be disassembled when desired.

One grouping of ornamental members for vehicle wheels which has found considerable favor in the industry includes a central ornamental member which is adapted to be detachably secured on the outer side of a vehicle wheel and a trim ring which is adapted to be more or less permanently secured to the wheel concentrically about the central ornamental member. Many different methods for detachably securing the central ornamental member to the wheel have, of course, been employed in the art. One method in particular which has been found to be highly satisfactory is described in my copending application for "Means for mounting ornamental wheel accessory," filed November 5, 1936, Serial No. 109,251.

It is an object of the present invention to provide a novel method of securing a trim ring to a vehicle wheel which is provided with central ornamental member retaining elements of the type described in my above referred to copending application.

It is a further object of this invention to provide a novel wheel assembly and method of assembling the same.

It is a still further object of this invention to provide a novel combination of vehicle wheel and ornamental accessories therefor which are economical to manufacture and which are rugged and reliable in use.

Another object of this invention is to provide a novel method and means for mounting a plurality of ornamental members on a wheel.

Another and further object of this invention is to provide a wheel having a plurality of obliquely rearwardly extending ornamental member retaining elements with a trim ring secured thereto in a novel manner.

The novel features which I believe to be characteristic of my invention are set forth with particularity in the appended claims. My invention itself, however, both as to its organization and manner of construction, together with further objects and advantages thereof, may best be understood by reference to the following description taken in connection with the accompanying drawings, in which:

Figure 1 is a front elevational view of a wheel assembly including a vehicle wheel, a trim ring, and a central ornamental member, the central ornamental member being partly broken away to show the spring fastening element carried on the wheel;

Figure 2 is a side elevational view partly in cross section taken along the line II—II of Figure 1;

Figure 3 is an enlarged fragmentary view in cross section taken along the line III—III of Figure 1;

Figure 4 is an elevational view in cross section of a preformed blank of sheet material from which the trim ring and the ornamental central member are to be cut;

Figure 5 is a view similar to Figure 4 but shows a preformed blank of sheet material severed and the edges of the resulting elements bent into their final form;

Figure 6 is a fragmentary elevational view partly in cross section illustrating the trim ring being mounted on the wheel by means of a press;

Figure 7 is a view similar to Figure 6 but shows the male element of the press in its final position, the trim ring having passed over the spring elements of the wheel; and Figure 8 is a view similar to Figure 7 but shows the male element of the press withdrawn and the spring elements in their normal position.

Referring now to Figures 1, 2, and 3 of the drawings, the wheel assembly illustrated includes a wheel 10 having a rim part 11 and a body part 12. The rim 11 is illustrated as being of the usual drop center type having a base flange 13, opposite side flanges 14, opposite intermediate flanges 15, and opposite edge portions 16. Body part 12 is illustrated as having a configuration similar to that recently adopted by many manufacturers to permit the use of a brake drum 17 which extends well beneath the base flange 13 of rim 11. As will be seen from the drawings, body part 12 includes a substantially laterally extending flange 18, the outer edge portion 19 of which is adapted to fit below the base flange 13 of rim 11 and be secured thereto in any suitable manner, such as by welding, riveting, or the like. The central portion of body part 12 includes a circular holding flange 20 which is adapted to be secured by suitable bolts (preferably five) to the axle plate 22 on the front face of brake arm 17.

Two ornamental members 23 and 24 are shown disposed on the outer side of wheel 10. Ornamental member 23 is a relatively large dome shaped centrally disposed member having an underturned outer edge 25. Ornamental member 24 is illustrated as being provided with some suitable configuration which is pleasing to the eye, and includes an underturned outer peripheral edge 26 which is adapted to bear against outer edge portion 16 of rim 11, and it is also provided with an obliquely forwardly extending inner edge portion 27 which is adapted to extend into biting engagement with laterally extending shoulder or flange 18. As is well known to those skilled in the art, the biting engagement made by obliquely forwardly extending edge 27 with the laterally extending shoulder or flange 18 causes ornamental member 24 to be tightly and substantially permanently mounted on the wheel.

The novel central ornamental member retaining means, which are illustrated as being a plurality of spring leaf elements, are secured to the outer face of body part 12. These elements may be formed of any suitable resilient material, such for example as spring steel. Elements 28 include a tail portion 29, an intermediate or main portion 30, and an end portion 31. Tail portion 29 is secured to the rear face of body part 12 in any suitable manner such as by a rivet 32. The intermediate portion 30 of element 28 extends obliquely rearwardly, as is clearly indicated in Figure 2 of the drawings. The outer end portion 31 of each leaf spring element 28 is bent so as to form a substantial angle with the main portion 30 of element 28 for a reason which will presently be explained.

As may be seen best in Figure 2 of the drawings, the free end portion 31 of the leaf spring element 28 extends through an aperture 33 located in laterally extending flange portion 18 of body part 12 in close proximity to the base flange 13 of rim 11. When spring elements 28 are in their normal unstressed position, the main body part 30 of each element 28 lies away from the plane of the aperture 33 in laterally extending shoulder or flange 18. That is, elements 28 are free to flex either toward or away from body part 12 of wheel 10. As ornamental member 23 is moved into desired position on wheel 10, elements 28 are flexed radially inwardly towards flange 18 by reason of the camming action of underturned edge 25 of member 23 on the main portion 30 of element 28. This camming action continues until the high points 34 of elements 28 snap up into ornamental member retaining position behind underturned edge 25.

It is to be observed that while elements 28 are easily flexed by a relatively slight deformation force in response to axial inward movement of member 23, elements 28 are extremely difficult to flex in response to axial outward movement of member 23. As the underturned edge 25 starts to move axially outwardly, the only way in which elements 28 can flex to permit such movement is for the underturned tip portion 31 of element 28 to slip rearwardly and radially inwardly. That is to say, outward movement of member 23 also causes inward flexing of element 28, and the force required to affect the flexing is relatively great compared with that required for inward movement of member 23, for in this case the free ends of elements 28 must move in a direction against the direction of the applied force. (It is, of course, to be understood that the terms "against" as used herein is not to be limited to mean a direction 180°, and only 180°, from the direction of the applied force, but on the other hand is used in its broader sense to mean "not having any component in the same direction.")

It will thus be apparent that the central ornamental member 23 is adapted to be mounted on wheel 10 by simply moving it axially inwardly against the side of the wheel. It should also be noted that with this particular arrangement, the ornamental member will be self centered on the wheel. It is to be observed that while only a very slight axial pressure on the outside of the ornamental member 23 is necessary to snap it into retaining engagement with the springs 28 carried on the wheel (in fact, it has been found in practice that an ornamental member of the character described may be mounted by simply pressing on it with one or two fingers), a relatively great force is necessary to dismount the ornamental member from the wheel. One convenient method for dismounting the ornamental member from the wheel is to insert a pry-off tool having a relatively sharp edge between the outer marginal extremity of ornamental member 23 and the intermediate side flange 14 of rim 11 and then give the tool a sharp jerk.

Now one of the important features of the present invention is the relation of the trim ring 24 to wheel 10, to the spring elements 28, and to the central ornamental member 23. As may be clearly seen in Figures 2 and 3 of the drawings, the inner edge 27 is bent obliquely forwardly and the diameter of the inner edge is such that when trim ring 24 is forced axially over shoulder 18, the edge 27 bites into engagement with the shoulder 18. Trim ring 24 is thus substantially permanently mounted on wheel with the inner edge 27 thereof disposed behind the spring elements 28. It is to be noted further that trim ring 24 may conveniently and readily be mounted on wheel 10 after spring elements 28 have been secured thereto by reason of the fact that the spring elements 28 may be flexed radially inwardly by the camming action of the inner edge 27 as the trim ring 24 is moved axially into engagement with the wheel 10.

In Figures 4 and 5 of the drawings I have shown how the central ornamental member 23 and the trim ring 24 may be cut from a single stamping of sheet material. In Figure 4 a single stamping is shown having a central crown portion 34 and an outer portion 35 having a configuration of the trim ring desired. At 36 the line of cut is indicated.

In Figure 5 the stamping of Figure 4 is shown after it has been cut, the outer edge 37 of the central crown portion 34 having been rolled inwardly and the inner edge of the outer portion 35 having been bent slightly upwardly as at 38. Portion 34 of the stamping is now precisely the same as central ornamental member 23 of Figures 1 to 3, and portion 35 of the stamping is now the same as ornamental trim ring 24 of Figures 1 to 3.

In Figures 6 to 8 of the drawings I have illustrated how the trim ring 24 may be mounted on wheel 10. The wheel 10 upon which the trim ring 24 is about to be mounted is placed over the base member 39 of a press 40. Trim ring 24 is then slipped over shoulder 18, and the male member 41 including a die 42 which fits the ring snugly is brought into engagement with the latter. Upon careful inspection of the drawings, it will be noted that there is a slight space 43 between the die 42 and the inner marginal edge 27 of ring 24, as well as a substantially triangular space 44 beneath the inner marginal portion of ring 24 which permits free curling of the latter at this point during the pressing operation. As pressure is applied in an axial direction, as is indicated by the arrow 45, marginal edge 27 curls itself against shoulder 18 and in consequence thereof makes a biting engagement therewith.

It is to be noted that as ring 24 is moved into position on shoulder 18, the spring elements 28 are cammed radially inwardly by the inner marginal edge 27. As may be clearly seen in Figure 7 of the drawings, the spring elements 28 do not interfere in any way with the operation of the press 40. Figure 8 shows the position of the various elements after male member 41 of the press 40 has been removed from wheel 10. At this time spring elements 28 have resumed their normal position slightly away from the plane of the aperture 33. It is also to be noted that due to the position and angle of the curled portion 27 of ring 24, any tendency of ring 24 to disengage itself from wheel 10 will only cause the inner edge of the ring to bite more firmly into shoulder 18.

It will be noted from the above description that during the pressing operation, the wheel itself acts as one of the die members of the press. As will be readily apparent to those skilled in the art, this eliminates the need for a separate female die member which would otherwise be required to cause the curling of the marginal edge or edges of the ring. Although in the drawings the upper die is illustrated as constituting the male member, it is to be understood that the wheel may be used as the male die member while the upper die is used as the female member with equal success.

While I have shown a particular embodiment of my invention, it will of course be understood that I do not wish to be limited thereto, since many other modifications may be made, and I therefore contemplate by the appended claims to cover all such modifications as fall within the true spirit and scope of my invention.

I claim as my invention:

1. In combination, a wheel including an outer tire rim and an inner wheel body provided with a plurality of circularly arranged openings and lateral cover retaining elements attached to and projecting from said wheel body bodily through said openings, and a circular wheel cover for disposition over said wheel body, including a circular crown portion having a concealed curled edge for snap-on engagement with said wheel body retaining elements, each of said elements extending radially outwardly and axially inwardly of its point of attachment to the wheel body.

2. In combination, a wheel including an outer tire rim and an inner wheel body provided with a plurality of circularly arranged openings and lateral cover retaining elements attached to and projecting from said wheel body bodily through said openings, and a circular wheel cover for disposition over said wheel body, including a circular crown portion having a concealed curled edge for snap-on engagement with said wheel body retaining elements, each of said retaining elements extending radially outwardly and axially inwardly of its point of attachment to the wheel body and including a shoulder extending at an oblique angle to said wheel body behind which said curled edge is adapted to be snapped.

3. In a wheel structure including a flanged tire rim, a wheel body attached thereto, a trim ring pressed on the wheel with one of its edges curved outwardly and into retaining engagement with said wheel adjacent the junction of the wheel body and the tire rim, a closure member for disposition on the wheel body, and means for providing a snap-on connection between said member and the wheel body comprising a plurality of retaining fingers attached to the wheel body and extending radially outwardly and axially inwardly from their points of attachment to the wheel body and each having a bent end, said closure member having a turned edge for engagement by the bent ends of said fingers, and which turned edge is of such diameter as to overlap and nest inside said curved ring edge to conceal the engagement between said trim ring and said wheel.

4. The combination with a wheel structure including a flanged tire rim, a wheel body attached thereto, and a trim ring pressed on the wheel with one of its edges curved outwardly and into retaining engagement with said wheel adjacent the junction of the wheel body and the tire rim, of a closure member for disposition on the wheel body, and means for providing a snap-on connection between said member and the wheel body comprising a plurality of retaining fingers attached to the wheel body and extending radially outwardly and axially inwardly of their points of attachment to the wheel body, said closure member having a rearwardly extending shoulder for engagement by said fingers, and which shoulder is of such diameter as to overlap and conceal the engagement between said trim ring and said wheel, each of said fingers having a bent end for engaging said shoulder on said closure member and for pressing said shoulder tightly against and into nested engagement with the curved edge of said trim ring.

5. In a wheel structure including a flanged tire rim, a wheel body attached thereto, a trim ring pressed on the wheel and into gripping engagement with said wheel adjacent the junction of the wheel body and the tire rim, and a closure member for disposition on the wheel and detachably held on the wheel by a snap-on connection, said trim ring and member being engaged by a portion of one being nested inside the other and whereby they may be concentrically aligned about the wheel axis.

6. In a wheel structure including a flanged tire rim, a wheel body attached thereto, a trim ring pressed on the wheel and into gripping engagement with said wheel adjacent the junction of the wheel body and the tire rim, and a closure member for disposition on the wheel and detachably held on the wheel by a snap-on connection, said trim ring and member being engaged by a portion of one being nested inside the other, said nested portions comprising curved edges on said trim ring and closure member, one curved edge being disposed axially and radially inside of the other edge so that said closure member is centered in respect to said trim ring and about the axis of the wheel.

7. In a vehicle wheel, a wheel body, a cover plate adapted to cover a substantial portion of said wheel body, means including an outwardly bulged portion of said wheel body for centering said cover plate, and means for securing said cover to said wheel body comprising resilient securing means on the portion for frictionally engaging said plate.

GEORGE ALBERT LYON.